L. E. UNDERWOOD & C. P. SMITH.
DYNAMO ELECTRIC MACHINE.
APPLICATION FILED OCT. 27, 1906.

959,901. Patented May 31, 1910.

Witnesses:
George A. Thornton,
Helen Oxford

Inventors,
Louis E. Underwood,
Charles P. Smith,
By Albert H. Dunn
Att'y.

UNITED STATES PATENT OFFICE.

LOUIS E. UNDERWOOD AND CHARLES P. SMITH, OF LYNN, MASSACHUSETTS, ASSIGNORS TO GENERAL ELECTRIC COMPANY, A CORPORATION OF NEW YORK.

DYNAMO-ELECTRIC MACHINE.

959,901.  Specification of Letters Patent.  Patented May 31, 1910.

Application filed October 27, 1906. Serial No. 340,812.

*To all whom it may concern:*

Be it known that we, LOUIS E. UNDERWOOD and CHARLES P. SMITH, citizens of the United States, residing at Lynn, county of Essex, State of Massachusetts, have invented certain new and useful Improvements in Dynamo-Electric Machines, of which the following is a specification.

Our invention relates to dynamo-electric machines and more particularly to machines such as motor generator sets which consist of a plurality of electrical units mechanically connected together, and has for its object to simplify and improve the same.

The various features of our invention will hereinafter be pointed out with particularity in the claims, but for a full understanding of our invention and of its various objects and advantages, reference may be had to the following detailed description taken in connection with the accompanying drawing.

Figure 1:
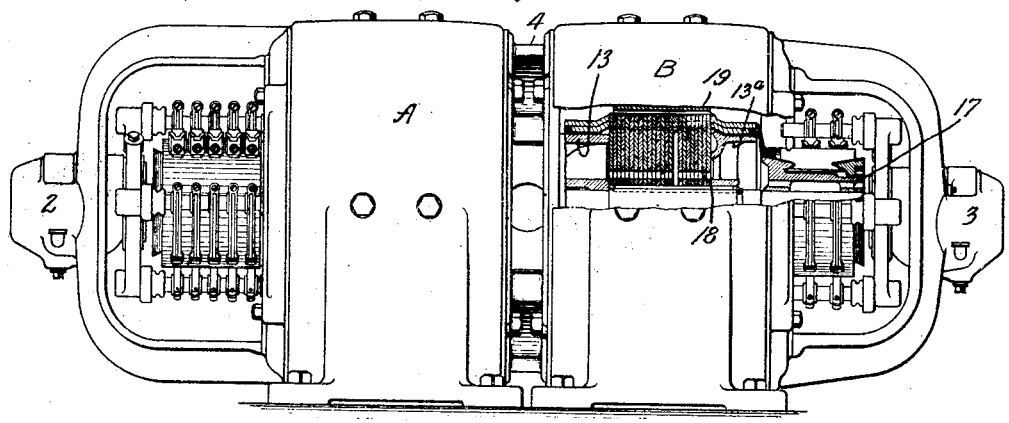
Figure 1:
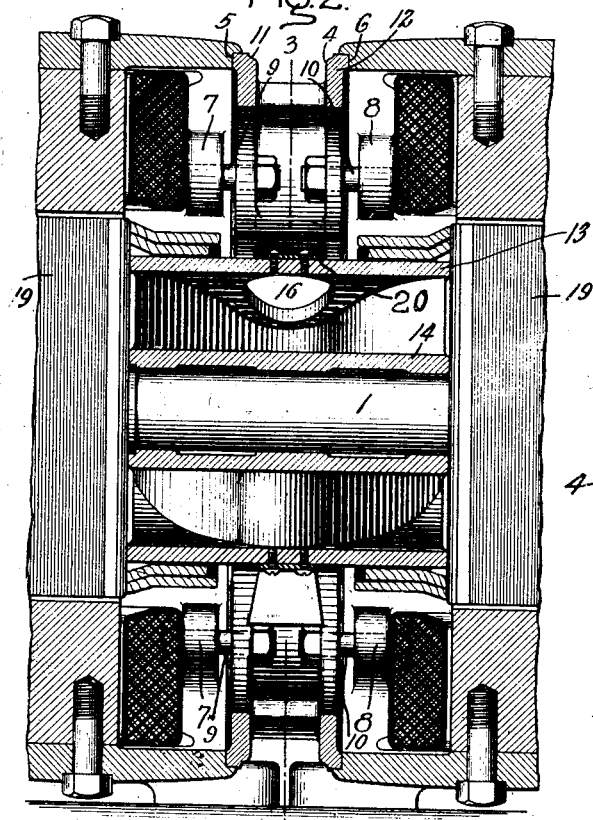
Figure 1:
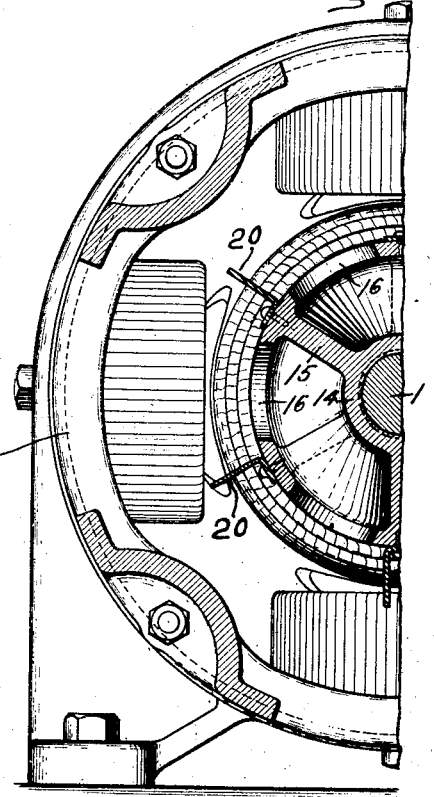
Figure 1:
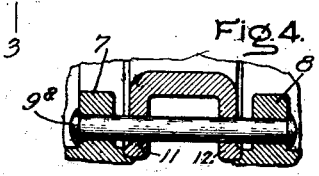

In said drawing, Figure 1 shows a motor-generator embodying our improvement, portions being broken away to more clearly disclose the novel features; Fig. 2 is an enlarged view showing in cross-section the adjacent ends of the motor and generator and the connections between them; Fig. 3 is a section taken on line 3, 3, of Fig. 2; and Fig. 4 is a detail showing a modification.

Reference being had to the drawing, A and B are two dynamo-electric machine units, either of which may be a motor and the other a generator. The main frames of these units may be the same as the usual frames of such machines when used independently of each other, except as will be hereinafter particularly pointed out. The usual end bearings at the adjacent ends of the units are removed and the two rotors are mounted upon a single shaft 1 which is seated at its opposite ends in the remaining end bearings 2 and 3. The frames of the two machines are securely fastened together into one rigid whole by means of an annular ring 4, which is preferably seated in grooves 5 and 6 in the edges of the frames. This ring is made as narrow as is convenient in order to reduce the length of the machine and make it as compact as possible. Furthermore, by shortening the machine as much as possible a center bearing for the rotor shaft may be dispensed with, particularly when the rotor member as a whole is stiffened as will be hereinafter described.

For the purpose of securing the parts rigidly together we preferably provide ears 7 and 8 projecting inward from the frames near the adjacent ends thereof. The machines illustrated have four poles and, therefore, four ears may conveniently be provided on each frame; the ears being arranged between the poles. Bolts 9 and 10 are passed through the ears 7 and 8, respectively, into flanges 11 and 12 at opposite ends of the ring. Thus, when the nuts on the bolts are tightened, the ring is drawn into the seats or grooves formed in the two frame members, thereby securely holding the several parts against displacement in any direction.

The gap between the two rotor members is bridged by a shell or drum 13 having a hub 14 surrounding the shaft. This drum is preferably made as large in diameter as the windings on the rotor members will permit, so as to serve as the inner abutment for the laminæ of each core. Thus, the drum and the cores are clamped into one continuous rigid member, mechanically considered, thereby reinforcing and stiffening the shaft to such an extent that the usual intermediate bearing becomes unnecessary. The drum serves the further function of supporting the end turns or connections of the rotor windings at the inner ends of the rotor members, taking the place of the usual flanged clamping rings, such as the rings 13ª at the outer ends of these members. The location of the drum is such that it lends itself readily to adaptation for ventilating purposes without impairment of its other functions. To this end it is divided into a number of compartments by means of spokes 15, which preferably extend throughout the length of the drum and between the hub and the outer shell portion. Openings 16 are formed in the drum between each consecutive pair of spokes; these openings being preferably in the plane of the ring 4. When the machine is set in motion the spokes 15 act as fan-blades and cause the air within the drum to be rotated and finally thrown outwardly through the peripheral openings. The ring 4 is therefore preferably perforated or made in skeleton form so as to permit the escape of this air. The fan action of the drum may be employed in any desired way to ventilate the machine so as to dissipate the heat generated therein. Thus, for example, the commutators of the machines may be provided with openings or channels 17 extending parallel to the axis, and similar openings or channels 18 may be formed in the cores 19 of the rotors. Then, when the machine is in operation, air is drawn through the channels 17 and 18 and into the drum, from which it is afterward expelled through the peripheral openings in the drum and out of the machine.

About the outer periphery of the member 13 are arranged a number of radial vanes 20, preferably located adjacent the openings 16, whereby increased ventilation is effected.

In Fig. 4 we have shown the connecting ring secured to the ears 7 and 8 by rivets 9ª extending entirely across the ring and into the ears.

What we claim as new and desire to secure by Letters Patent of the United States, is,—

1. A rotor member for dynamo-electric machines consisting of a shaft, a spacing member on said shaft, a pair of cores mounted on the shaft on opposite sides of the spacing member and held against the ends of said member, and windings on one of said cores having end turns or connections supported upon said spacing member.

2. A rotor member for dynamo-electric machines consisting of a shaft, a pair of cores arranged on said shaft, a drum mounted upon said shaft and clamped between the ends of said cores, and windings on one of said cores having end turns or connections supported upon said drum.

3. A rotor member for dynamo-electric machines, consisting of a shaft, a pair of cores arranged on said shaft, and a hollow drum mounted on the shaft between the said cores, said cores having ventilating openings leading into the interior of the drum.

4. A rotor member for dynamo-electric machines, consisting of a shaft, a pair of cores arranged on said shaft, a hollow drum mounted on the shaft between said cores, and windings upon said cores having end turns or connections supported upon said drum.

5. A rotor member for dynamo-electric machines consisting of a shaft, a pair of cores arranged on said shaft, a hollow drum mounted on the shaft between said cores, and windings on said cores having end turns or connections supported upon said drum, said cores having ventilating openings leading into the interior of said drum.

6. A rotor member for dynamo-electric machines, consisting of a shaft, a hollow drum mounted upon said shaft, and a pair of cores arranged on said shaft and held against opposite ends of said drum, said cores having ventilating openings leading into the interior of said drum, and said drum having openings in its periphery.

7. A rotor member for dynamo-electric machines, consisting of a shaft, a hollow drum on said shaft, a pair of cores held against the ends of said drum, and radially-extending partitions in said drum, said drum being provided with peripheral openings between said partitions.

8. In a dynamo electric machine, a shaft, a hollow drum mounted on said shaft and having openings in its periphery, two rotor members comprising cores mounted on said shaft and held against the ends of said drum, said members having ventilating channels leading into the interior of said drum, and fan blades on the exterior of said drum adjacent said openings.

9. In a dynamo electric machine, a shaft, a hollow drum mounted on said shaft and having openings in its periphery, a pair of cores held against the ends of said drum, said cores having ventilating channels leading into the interior of said drum, radially-extending partitions in said drum, and fan blades on the exterior of said drum adjacent said openings.

10. In combination, two dynamo-electric machine units, an annular perforated ring arranged between and secured to the adjacent ends of the frames of said units, a common shaft for the rotors of said units, and a fan member mounted on said shaft between the rotors and in the plane of said ring.

11. In combination, two dynamo-electric machine units, an annular perforated ring arranged between and secured to the adjacent ends of the frames of said units, a common shaft on which the two rotors are mounted, and a combined spacing and ventilating device arranged on said shaft between said rotors.

12. In combination, two dynamo-electric machine units, an annular perforated ring arranged between and secured to the adjacent ends of the frames of said units, a common shaft on which the two rotors are mounted, a hollow drum mounted on said shaft and having its ends in engagement with said rotors, and means associated with said drum for producing a circulation of air.

13. In combination, two dynamo-electric machine units, an annular perforated ring arranged between and secured to the adjacent ends of the frames of said units, a common shaft on which the two rotors are mounted, a hollow drum mounted on said shaft between and having its ends in engagement with said rotors, said drum having radially-extending partitions and peripheral openings arranged in the plane of said ring.

14. In combination, two dynamo-electric machine units, an annular perforated ring arranged between and secured to the adjacent ends of the frames of said units, a shaft on which the two rotors are mounted, and a combined spacing and ventilating member mounted upon said shaft between said rotors, said rotors having ventilating channels leading to points adjacent said combined spacing and ventilating member.

15. In combination, two dynamo-electric machine units, an annular perforated ring arranged between and secured to the adjacent ends of the frames of said units, a shaft on which the two rotors are mounted, a combined spacing and ventilating member mounted upon said shaft between said rotors, said rotors having ventilating channels leading to points adjacent said combined spacing and ventilating member, and fan blades on the exterior of said member for expelling air through said perforated ring.

In witness whereof, we have hereunto set our hands this twenty-fifth day of October, 1906.

LOUIS E. UNDERWOOD.
CHARLES P. SMITH.

Witnesses:
JOHN A. McMANUS, Jr.,
HENRY O. WESTENDARP.